Aug. 28, 1962      G. F. DAVEY      3,051,059
TUBE END MILLING MACHINE
Filed Jan. 2, 1959
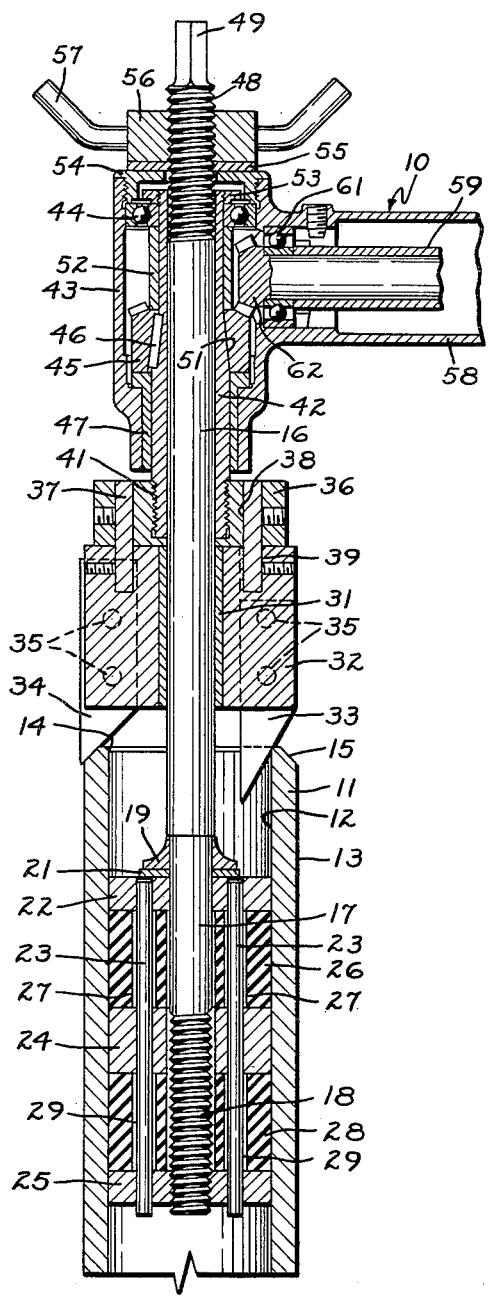
INVENTOR.
Gerald F. Davey
BY
Norman S. Blodgett
Attorney

United States Patent Office 3,051,059
Patented Aug. 28, 1962

3,051,059
TUBE END MILLING MACHINE
Gerald F. Davey, Holden, Mass., assignor to Riley Stoker Corporation, Worcester, Mass., a corporation of Massachusetts
Filed Jan. 2, 1959, Ser. No. 784,634
2 Claims. (Cl. 90—12)

This invention relates to a tube end milling machine and more particularly to apparatus arranged properly to face the end of a tube prior to a welding operation.

In welding the end of one tube to the end of another one, particularly in the construction of boilers, it is quite important that the tubes be accurately aligned so that their inner surfaces are concentric. If the axes of the inner surfaces are displaced from one another, the flow of fluid through the finished joint will be restricted and, furthermore, the resulting weld will have less than the optimum strength. Now, commercially-produced tubes vary not only in their inside and outside diameters but also in the concentricity of their outside surface with the inside surface. It will be understood, then, that, even though the outside diameters are concentric, this fact does not guarantee that the inside diameters are properly concentric. Therefore, if the means of aligning the tubes makes use of the outside diameters, the inside diameters might be offset from one another. In joining tubes by welding it is the usual practice to provide the inside corner of the end of the tube with a slight bevel to receive a backing ring which is annular and is of generally triangular cross-section. Equilateral sides of the triangle fit against the inner bevels of the adjacent tube ends and the base of the triangle constitutes a surface which is concentric with the tube inner surfaces. The backing ring holds the tube ends in a slightly spaced condition in the axial direction. The tube ends are also provided with a generous bevel at the outside corner which combines with the spacing between the tubes to produce a welding channel in which the welding operation is performed. Devices conceived in the past for producing these bevels on the ends of the tubes had suffered from a number of deficiencies, not the least of which is the failure to produce bevels which were concentric with the inside surfaces of the tubes so that the backing ring was able to align the tubes properly. These and other difficulties experienced with the prior art devices have been obviated in a novel manner by the present invention.

It is, therefore, an outstanding object of the invention to provide a tube end milling machine which assures that bevels cut in the ends of a tube are concentric with the tube inner surface.

A further object of the invention is the provision of a tube end milling machine having a means for accurately and quickly aligning it with the inner surface of a tube.

Although the novel features which are believed to be characteristic of this invention will be particularly pointed out in the claims appended hereto, the invention itself as to its objects and advantages, the motive of its operation, and the manner of its organization may be better understood by referring to the following description taken in connection with the accompanying drawing forming a part thereof and which:

The single figure is a longitudinal sectional view of a machine embodying the principles of the present invention.

Referring to the drawing, it will be seen that the tube end milling machine, indicated generally by the reference numeral 10, is shown in use with a tube 11, which tube has an inner cylindrical surface 12 and an outer cylindrical surface 13. The tube end milling machine is used to produce a small bevel 14 at the intersection of the inner surface 12 with the end of the tube and a larger bevel 15 at the intersection of the outer surface 13 with the end of the tube. The inner bevel 14 is used with the corresponding bevel of an opposed tube and with a backing ring to help in carrying out the welding process and, of course, the corner 15 forms one side of a welding trough in which the weld metal is laid.

The supporting shaft 16 extends entirely through the machine and lies within the tube 11 during the milling operation. The shaft is provided with a reduced portion 17 at its lower end and this reduced portion is provided with threads 18. On the reduced portion 17 is placed a transition member 19 which contacts the shoulder between the reduced portion 17 and the remainder of the shaft 16. A washer 21 lies against the transition member and a disk 22 is slidably engaged with the washer and is slidably arranged on the reduced portion 17 of the shaft. The disk 21 has an outer diameter slightly less than the minimum diameter of any of the tubes encountered and has pins 23 fixed thereto and extending longitudinally thereof. Slidable over the pins 23 and slidably mounted on the shaft 16 is a disk-like washer 24. A nut 25 is threadedly mounted on the threaded portion 18 of the shaft, the washer 24 and the nut 25 each having an outside diameter similar to that of the disk, 22, this being less than the minimum diameter encountered in tubes of the class being milled. The pins 23 extend through corresponding holes in the washer 24 and the nut 25. Between the washer 22 and the washer 24 extends a rubber block 26 having holes for the passage of the pins 23 therethrough, the holes being considerably larger than the diameter of the pins. In its relaxed or unstressed condition the rubber block 26 has an outside diameter which is less than the minimum diameters of the inside surfaces of the tubes of the type being operated on. A similar block 28 having apertures 29 extending therethrough lies between the washer 24 and the nut 25 and has a diameter similar to that of the block 26.

Slidably mounted over the shaft 16 by means of a bushing 31 is a tool head 32 having a plurality of beveling tools. One series of beveling tools 33 is used for producing the bevel 14 at the inside edge of the tube while another series of cutting tools 34 is arranged to produce the bevel 15 at the outer edge of the end of the tube. Suitable set screws 35 provide for fastening the cutting tools 33 and 34 to the tool head 32. An adapter ring 36 overlies the upper end of the tool head 32 and a series of metal pegs 37 extend from bores 38 of the adapter ring 36 into bores 39 extending longitudinally into the tool head 32, there being set screws to hold the pegs in the bores. The upper end of the adapter ring 36 is provided with a threaded counterbore 41 into which is threaded one end of a hollow shaft 42, the inner bore of the shaft 42 closely fitting over the surface of the shaft 16. A drive housing 43 surrounds the shaft 42 and supports it by means of ball bearings 44. Also extending between the housing 43 and the hollow shaft 42 is a bevel gear 45 which is locked to the shaft 42 by means of a key 46. A bushing 47 extends between the shaft 42 and the housing 43 at the end thereof opposite the ball bearing 44. The upper end of the shaft 16 is provided with threads 48 and a wrench-engaging surface 49. The gear 45 has a tapered inner bore which engages a suitably tapered portion 51 of the shaft 42 and the gear is maintained on this taper by means of a sleeve 52 suitably mounted on the upper end of the shaft 42, the sleeve 52 being kept in place by the inner race of the ball bearing 44 and by a nut 53 which is engaged with a short threaded portion at the upper end of the shaft 42. The upper end of the housing 43 is sealed by a closure 54 which is threaded therewith and through which passes the shaft 16. A washer 55 overlies the closure 54 and this is followed by a nut 56 having hand-engaging fingers 57 for the actuation thereof. The housing 43 is provided with a right angle hollow arm 58 in which is carried a hollow shaft 59 suitably mounted in a ball bearing 61. The end of the shaft 59 is provided with a bevel gear 62 which meshes with the bevel gear 45. A suitable air motor or electrical motor is mounted outboard of the arm 58 to drive the shaft 59, but for the sake of simplifying the illustration, this motor has been omitted in the drawing.

The operation of the machine of the invention will now be readily understood in view of the above description. Before the operation is begun the rubber blocks 26 and 28 are in relaxed or unstressed condition. The shaft 16 and the disk 22, the washer 24, the nut 25, and the blocks 26 and 28 are inserted into the tube. The associated members are pushed into the tube until the tools 33 and 34 arrive adjacent the upper end of the tube. When the nut 56 is loosened, so that it is possible to rotate the shaft 16 by means of the wrench-engaging surfaces 49 relative to the housing 43 and the tool head 32 which is fixed thereto. The friction of the blocks 26 and 28 on the inner surface 12 of the tube 11 prevents the disk 22, the washer 24, and the nut 25 from rotating when the shaft 16 is rotating, the elements all being keyed to one another by means of the pins 23. Therefore, the rotation of the shaft 16 and engagement of the threads 18 with the nut 25 cause the nut 25 to move toward the disk 22. This movement of the nut 25 toward the disk 22 causes the rubber blocks 26 and 28 to be compressed so that they expand outwardly and engage the inner surface 12 of the tube very tightly. This action causes the shaft to be very accurately located concentrically of the inner surface of the tube which means that the tool head 32 and its tools are also concentrically located. When the blocks 26 and 28 have been adequately expanded by rotation of the shaft 16, the nut 56 is again rotated to advance the housing 43 and the tool head 32 toward the tube 11. Then, the motor, which is not shown, is energized, either electrically or pneumatically to rotate the shaft 59 which acts through the bevel gear 62 and the bevel gear 45 to rotate the shaft 42. Rotation of this shaft produces a similar rotation of the adapter ring 36 and the tool head 32. Advancement of the tool head with the tools 33 and 34 toward the end of the tube is brought about by further rotation of the nut 56 and the tools eventually form the bevels 14 and 15 in the usual manner.

It will be understood that this apparatus is adaptable to tubes of various nominal inside diameters but for each nominal size of tube a separate tool head 32 must be provided, as well as a separate set of disks 22 and 24, nut 25, and rubber blocks 26 and 28. In most areas of operation, however, such as would be encountered in the erection of boilers, the tube sizes throughout a given boiler is the same nominal size. This means that there is no need to change the tool head, rubber blocks, and associated parts except at very infrequent intervals.

While certain novel features of the invention have been shown and described and pointed out in the annexed claims, it will be understood that various omissions, substitutions, and changes in the forms and details of the device illustrated and in its operation may be made by those skilled in the art without departing from the spirit of the invention.

The invention having been thus described, what is claimed as new and desired to secure by Letters Patent is:

1. A tube end milling machine, comprising a tool head, an elongated shaft on which the tool head is slidably rotatably supported, means for rotating the tool head, threads formed on one end of the shaft, a stop member on the shaft adjacent the said threads, a nut engaging the said threads, a rubber-like annular block consisting of a series of cylindrical disks lying between the said member and the nut, the block having an outer cylindrical surface with a relaxed diameter less than the minimum inner diameter likely to be encountered in tubes of the nominal size being milled, threads formed on the other end of the shaft, a hand-actuated nut engaging the last-named threads for moving the tool head toward the said one end of the shaft and a rod spaced from and parallel to the shaft extending through the stop member, disks, and the first-named nut to prevent rotation of these elements relative to one another.

2. A tube end milling machine, comprising a tool head, an elongated shaft on which the tool head is slidably and rotatably supported, means for rotating the tool head, threads formed on one end of the shaft, a stop member on the shaft adjacent the said threads, a nut engaging the said threads, a rubber-like annular block lying between the said member and the nut, the block having an outer cylindrical surface with a diameter less than the minimum inner diameter likely to be encountered in tubes of the nominal size being milled, the block consisting of a number of disks, threads formed on the other end of the shaft, a hand-actuated nut engaging the last-named threads for moving the tool head toward the said one end of the shaft, and a housing mounted on the shaft and containing the said means, and a plurality of rods extending through the disks and the first-named nut to lock them against rotation relative to one another.

References Cited in the file of this patent

UNITED STATES PATENTS

| | | |
|---|---|---|
| 163,217 | Lawson | May 11, 1875 |
| 1,719,599 | Dickson | July 2, 1929 |
| 1,721,310 | Miller | July 16, 1929 |
| 1,972,022 | Le May | Aug. 28, 1934 |
| 2,226,078 | Spahn | Dec. 24, 1940 |
| 2,453,848 | Livingston | Nov. 16, 1948 |
| 2,682,181 | Toth et al. | June 29, 1954 |
| 2,746,497 | Thompson | May 22, 1956 |
| 2,749,809 | Anderson | June 12, 1956 |
| 2,870,686 | Smith | Jan. 27, 1959 |

FOREIGN PATENTS

| | | |
|---|---|---|
| 332,272 | Germany | Jan. 27, 1921 |
| 39,347 | Norway | July 21, 1924 |
| 563,988 | Canada | Sept. 30, 1958 |